US007827191B2

(12) United States Patent
Williams

(10) Patent No.: US 7,827,191 B2
(45) Date of Patent: Nov. 2, 2010

(54) DISCOVERING WEB-BASED MULTIMEDIA USING SEARCH TOOLBAR DATA

(75) Inventor: Hugh Evan Williams, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 11/300,803

(22) Filed: Dec. 14, 2005

(65) Prior Publication Data

US 2007/0136263 A1    Jun. 14, 2007

(51) Int. Cl.
    *G06F 17/30* (2006.01)
(52) U.S. Cl. ...................................... 707/776
(58) Field of Classification Search ............. None
    See application file for complete search history.

(56) References Cited

U.S. PATENT DOCUMENTS

| | | | | |
|---|---|---|---|---|
| 5,903,892 | A * | 5/1999 | Hoffert et al. | 707/10 |
| 6,253,198 | B1 * | 6/2001 | Perkins | 1/1 |
| 6,278,992 | B1 * | 8/2001 | Curtis et al. | 1/1 |
| 6,314,420 | B1 * | 11/2001 | Lang et al. | 707/3 |
| 6,415,319 | B1 * | 7/2002 | Ambroziak | 709/219 |
| 6,421,675 | B1 * | 7/2002 | Ryan et al. | 707/100 |
| 6,438,579 | B1 * | 8/2002 | Hosken | 709/203 |
| 6,516,337 | B1 * | 2/2003 | Tripp et al. | 709/202 |
| 6,631,369 | B1 * | 10/2003 | Meyerzon et al. | 1/1 |
| 6,718,365 | B1 * | 4/2004 | Dutta | 709/203 |
| 7,093,012 | B2 * | 8/2006 | Olstad et al. | 709/224 |
| 7,483,910 | B2 * | 1/2009 | Beyer et al. | 1/1 |
| 7,676,553 | B1 * | 3/2010 | Laucius et al. | 709/219 |
| 2002/0156870 | A1 * | 10/2002 | Boroumand et al. | 709/219 |
| 2006/0059225 | A1 * | 3/2006 | Stonehocker et al. | 709/202 |
| 2007/0112757 | A1 * | 5/2007 | Bates et al. | 707/5 |
| 2008/0097958 | A1 * | 4/2008 | Ntoulas et al. | 707/2 |
| 2008/0104047 | A1 * | 5/2008 | Nagarajayya | 707/5 |

OTHER PUBLICATIONS

Intelligent Web Prefetching Based upon User Profile, http://www.springerlink.com/content/thfh2j0r4mggk19u/fulltext.pdf, Apr. 1, 2004.*

* cited by examiner

*Primary Examiner*—Neveen Abel Jalil
*Assistant Examiner*—Kellye D Buckingham
(74) *Attorney, Agent, or Firm*—Shook, Hardy & Bacon L.L.P.

(57) ABSTRACT

Toolbar search data is utilized to facilitate search engine crawlers to locate resources on a network such as, for example, multimedia resources on the Internet. In one instance, for example, users who opt into a user feedback experience have their toolbar searches relayed to a toolbar data mining component which augments a multimedia crawler in locating the multimedia resources. A media inspection component is then employed to determine the content of the media resource and, when appropriate, the media resource is then indexed for utilization in search engine indexing nodes and the like. This allows resources, for example, such as multimedia resources, that are typically undiscoverable by search engine crawlers to be located and indexed for searching.

16 Claims, 10 Drawing Sheets

DISCOVERING WEB-BASED MULTIMEDIA USING SEARCH TOOLBAR DATA

BACKGROUND

As the Internet becomes more widespread, the amount of data that can be accessed increases as well. However, access to the data does not necessarily mean an Internet user can actually find the data. The sheer quantity of data available often overwhelms a user, and they often resort to using search engines to help them easily locate desired information. This was initially a suitable means to find data but as the quantity increased, the mechanisms that located the data (e.g., search crawlers) began to look at only a portion of the information on a Web page to determine its relevancy due to the massive quantity of data it must review. Thus, Web page owners increased their Web page accesses by including even non-relevant terms as part of the metadata that a search crawler would encounter. The search crawlers themselves then became smarter and some can even review the information in context to determine its true relevancy to a particular topic.

Unfortunately, Web pages themselves have become even more complex over time and have even challenged the smartest of the search crawlers. Employment of scripting and other automated means have generally left the average search crawlers misinterpreting and/or missing entirely the information on some Web pages. This is because a search crawler typically looks at textual data to index the Web pages. Other data artifacts on the Web page are largely ignored and lost to the general user who desires to find such information. This is unfortunate because as the Internet evolves it will contain increasingly complex data formats to facilitate in condensing large quantities of data even further. Thus, on the one hand, a Web page will be able to offer more information, but at the same time it may reduce the availability and access to users because of the complexity.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to search engines, and more particularly to systems and methods for locating network resources via employment of toolbar search data. "Organic crawlers" or users of search toolbars facilitate search engine crawlers to locate resources on a network such as, for example, multimedia resources on the Internet. Since a majority of the Internet contains Web pages that are designed to be intuitive from a user perspective, an 'organic crawler' can typically achieve a higher rate of resource discovery than a context-based search engine crawler. In one instance, for example, users who opt into a user feedback experience have their toolbar searches relayed to a toolbar monitoring system which augments a multimedia crawler in locating multimedia resources. A media cracker is then employed to determine the content of the media resource and, when appropriate, the media resource is then indexed for utilization in search engine indexing nodes and the like. This allows multimedia resources that are typically undiscoverable by search engine crawlers to be located and indexed for searching. Thus, a substantial increase in indexed multimedia resources is provided by leveraging the toolbar search data.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
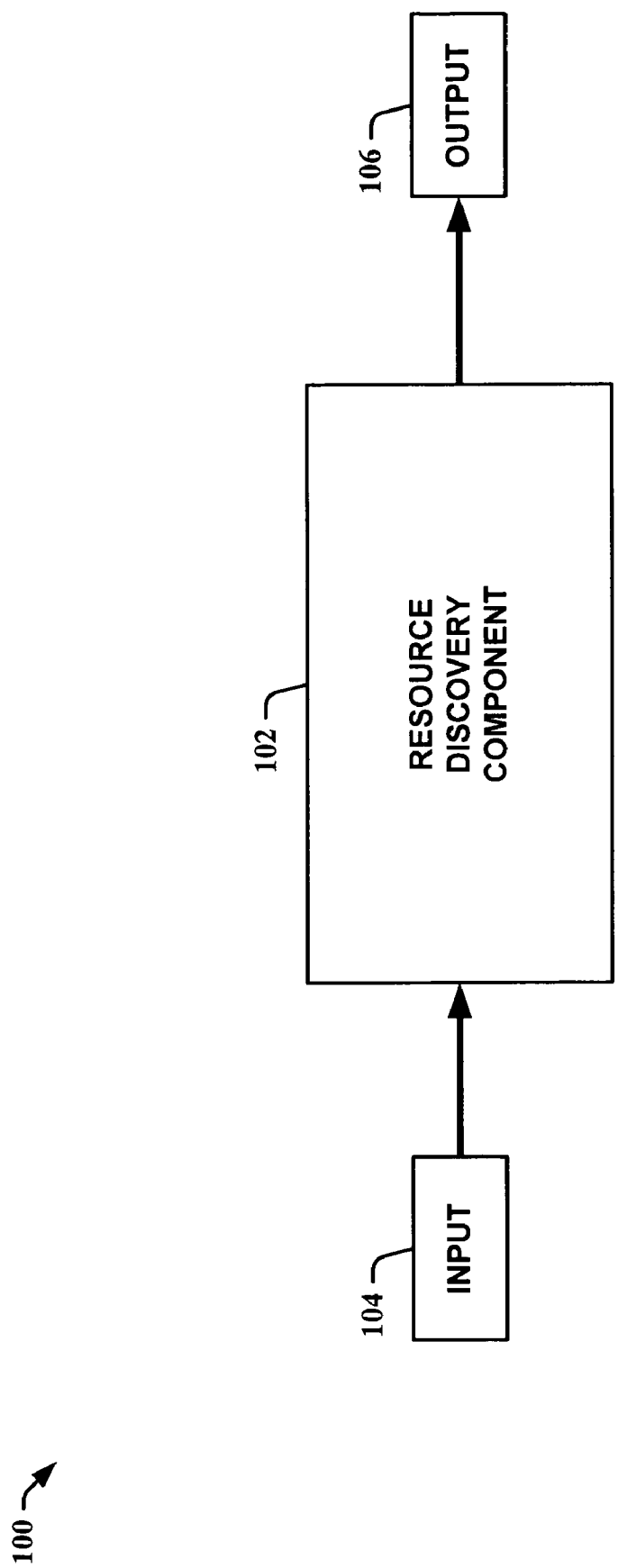
FIG. 1 is a block diagram of a resource discovery system in accordance with an aspect of an embodiment.

Multimedia resources often tend to be the hardest resources to discover. Because of this, multimedia searches that include, for example, image, audio, and/or video information searches, make up only about 10% of total user query traffic. Online multimedia search currently remains experimental and major search engines have either no or limited video search features. However, it is likely that multimedia retrieval will grow in popularity as new applications are developed and refined, consumer hardware (such as digital video recorders) becomes cheaper, and the Web is used in new ways to publish and share data.

Current Web-based video search technology is ineffective for many reasons. First, it is based on a keyword search and not on searching the media itself. A video is typically indexed by its URL and text from the Web page in which it appears; queries that match this text return the video as an answer, and very little information from the video media itself is used in the querying process. Second, many video formats exist, each requiring different pre-processors and analysis tools. It is also currently unclear how to deal with formats that are used to render and animate entire web pages. Third, annotating video streams with keywords that can be used in the search process requires extracting features from video and nearby, contextually-related Web page elements. And, fourth, video media is difficult to discover on the Web. In particular, timely discovery of new, popular content such as news stories and sports programs is difficult with conventional Web crawling techniques.

Instances of the systems and methods herein facilitate in multimedia searching by employing search toolbar log data. Search toolbars are downloaded and installed into Web browsers to improve the Web search experience. They offer users many useful features: for example, when a user installs a search toolbar, they add to their browser an environment that allows them to perform Web and desktop searches in one place, without running external software or visiting a Web resource. In addition, toolbars typically provide pop-up blockers, form-filling agents and/or wizards, and other useful tools.

Toolbar data can be collected directly and/or collected and logged from users who, for example, select to participate in data sharing schemes such as opting into a customer experience improvement program. A wide range of data can be gathered from a search toolbar. For example, the data can include, but is not limited to, URLs visited by the user, URLs added to favorites, page print events, and/or the time taken to return to a search results list after visiting a link. The data can be logged locally and/or centrally and can be made available in substantially real time to a search engine operational environment and the like. Instances of the systems and methods herein can utilize, for example, URLs visited by the user to discover resources such as, for example, multimedia data and related information.

Toolbar data can be used in several ways to discover, index, and/or search multimedia resources and the like. First, when a user loads a URL with their browser, it can be logged by the toolbar. By examining the URL and comparing it to a list of URLs known by a search engine, it is possible to identify resources. These resources can be subsequently retrieved by a Web crawler, processed, and/or indexed for search and the like. This has several advantages over traditional crawl-based discovery, namely: it allows timely discovery of resources; for example, on average, an author visits their own published media one week before a standard Web crawler does, and a low or high visit frequency by users is generally a strong indication of popularity and can aid in assigning a crawl priority.

Second, consecutive, related events can be identified from toolbar data. For example, when a user visits a Web page and clicks on a link to load a multimedia item, both events are logged and their relationship can be determined. Known relationships aid resource indexing. For example, when a user visits a page and clicks on a link to a multimedia resource, a relationship is inferred between the page, its metadata, and the multimedia item. This can, for example, aid in identifying text that should be associated with a multimedia item; this is particularly useful when the link is difficult to discover within the Web page, such as when it is embedded in client-side scripts and the like. And, third, visit frequency can be used for ranking of search results as well.

Instances of the systems and methods herein can provide for the timely discovery of resources by fully leveraging this toolbar data. One advantage of this, for example, is that popular, new multimedia data can be found by search engine customers, when it would otherwise be undiscoverable. Toolbar metrics such as, for example, URL visit frequency, can also be utilized, for example, to assign crawl priority and the like and/or as a ranking feature.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Multimedia is very difficult to discover on a network such as the Internet and/or an intranet and the like. In particular, timely discovery of new, popular content such as news stories and sports programs is difficult with conventional Web crawling techniques. Instances of the systems and methods herein employ search toolbar data to address this deficiency. The lure of search toolbars is that they offer users many useful features. For example, when a user installs a Web-browser based search toolbar, they add to their browser an environment that allows them to perform Web and desktop searches in one place, without running external software and/or visiting a Web search page.

In addition, toolbar data can be collected and logged from users to augment search engine crawler data. The data can include, but is not limited to, Uniform Resource Locators (URLs) visited by the user, URLs added to favorites, page print events, and the time taken to return to a search results list after visiting a link and the like. For example, the data can be logged centrally and made available in substantially real time to a search engine operational environment. Instances of the systems and methods herein make use of the toolbar data such as, for example, URLs visited by the user, to discover multimedia data and related information. Toolbar metrics such as, for example, URL visit frequency and the like can also be utilized to, for example, assign crawl priority and/or can be utilized as a ranking feature.

In FIG. 1, a block diagram of a resource discovery system 100 in accordance with an aspect of an embodiment is shown. The resource discovery system 100 is comprised of a resource discovery component 102 that receives an input 104 and provides an output 106. The input 104 is generally comprised of search information contained in toolbar data from a search toolbar. Search toolbars are frequently utilized by users to assist browsers in allowing localized and/or non-localized searching from a single application. Additional benefits can also typically be gained by toolbar usage so users tend to frequently employ them. The toolbar tends to aggregate search data for these reasons and becomes a good source for personalized search data for each user. The input 104 can be obtained directly from a search toolbar, and/or it can also be obtained from a search toolbar data source that can be local and/or remote. A search toolbar data source can include a database with direct access and/or accessible via data servers (e.g., a toolbar data server farm, etc.) and the like.

The resource discovery component 102 mines the input 104 for resource information. A resource can include, but is not limited to, text, graphics, audio, and/or video resources and the like. A resource generally includes "multimedia" type resources as well as traditional "non-multimedia" resources.

Thus, resource information can include, but is not limited to, resources visited by a user, resource locations added to a user's favorites list, resource print events, time spent on a resource, and/or access frequencies for a resource and the like. By employing the resource information, the resource discovery component 102 can facilitate in determining resources (e.g., context of a resource and the like can be utilized to identify the resource, etc.). The output 106 provided by the resource discovery component 102 can include, but is not limited to, resource information such as, for example, resources, unique resources, resource metadata, and/or contextual information and the like. The output 106 can also be utilized to facilitate a search engine in searching and/or querying identified resources.

Figure 2:
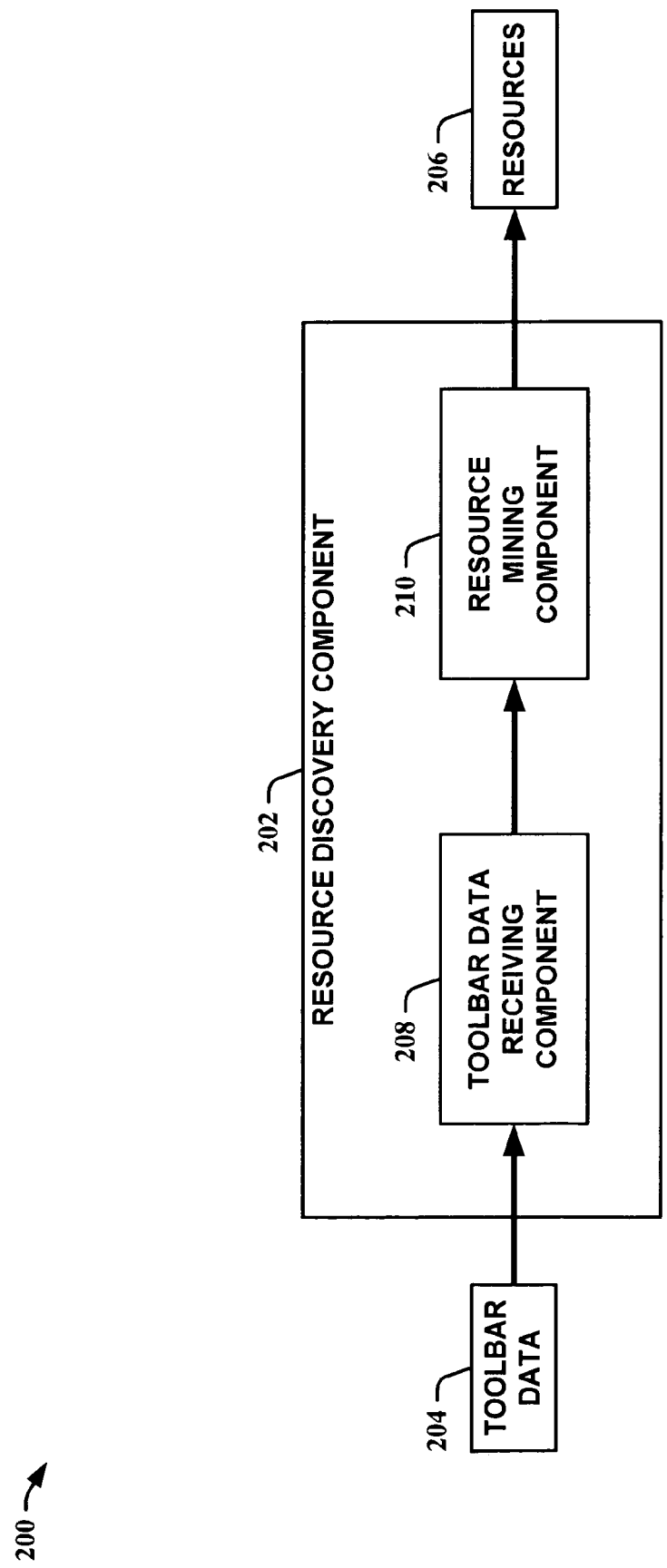
FIG. 2 is another block diagram of a resource discovery system in accordance with an aspect of an embodiment.

Looking at FIG. 2, another block diagram of a resource discovery system 200 in accordance with an aspect of an embodiment is depicted. The resource discovery system 200 is comprised of a resource discovery component 202 that receives toolbar data 204 and provides resources 206. The resource discovery component 202 is comprised of a toolbar data receiving component 208 and a resource mining component 210. The toolbar data receiving component 208 obtains the toolbar data 204 from a toolbar data source such as, for example, a toolbar data store, a toolbar data server, and/or directly from a toolbar and the like. The resource mining component 210 receives the toolbar data 204 from the toolbar data receiving component 208 and mines the toolbar data 204 for resource information to provide resources 206. The mined resource information, as described above, can include not only resource locations but also resource related information such as metadata related to a resource. Thus, this instance can be employed to mine toolbar data to assist search engines, search crawlers, and/or other devices/components that utilize resource information to perform a function and/or to provide additional information and the like.

Figure 3:
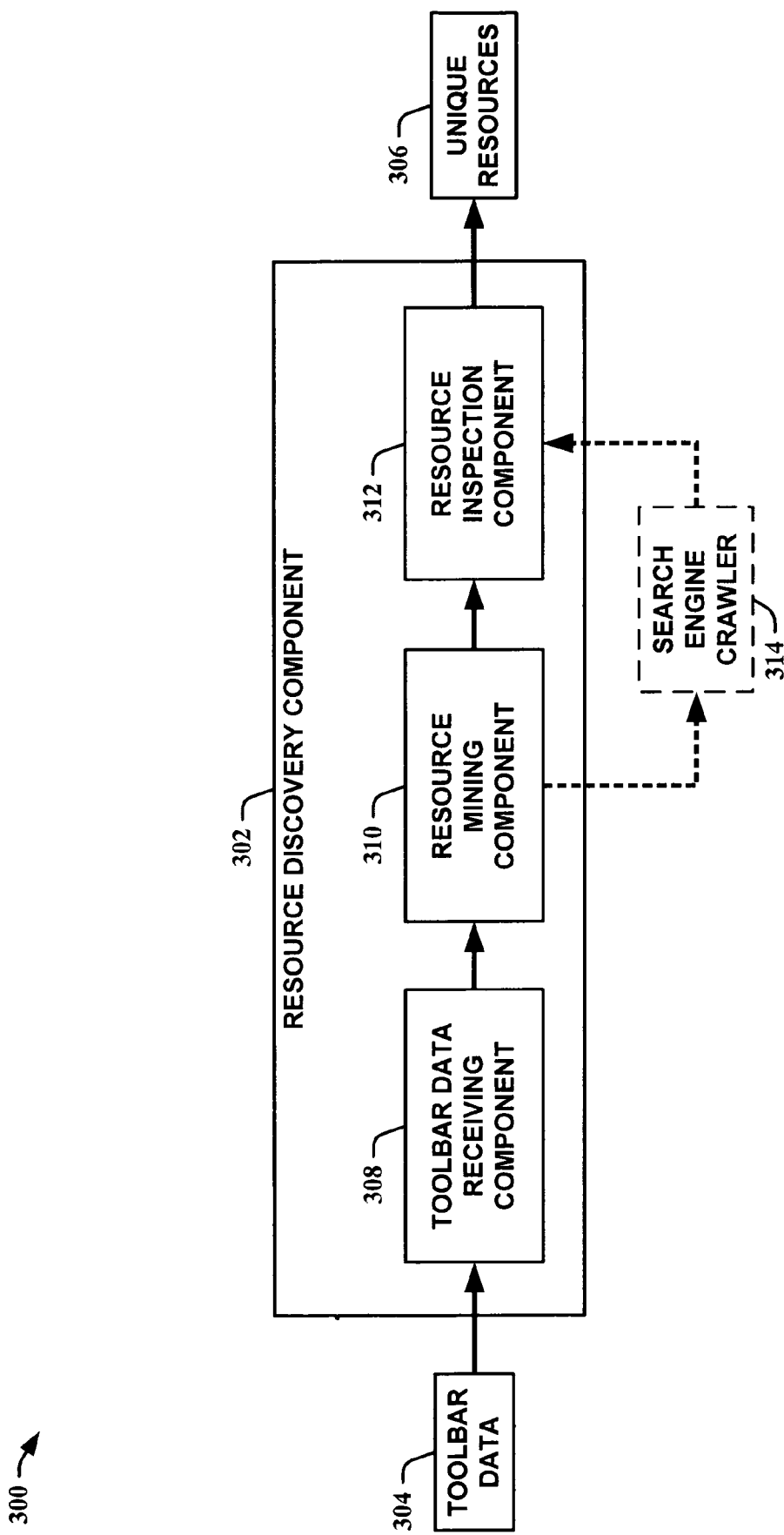
FIG. 3 is yet another block diagram of a resource discovery system in accordance with an aspect of an embodiment.

Turning to FIG. 3, yet another block diagram of a resource discovery system 300 in accordance with an aspect of an embodiment is illustrated. The resource discovery system 300 is comprised of a resource discovery component 302 that receives toolbar data 304 and provides unique resources 306. The resource discovery component 302 is comprised of a toolbar data receiving component 308, a resource mining component 310, and a resource inspection component 312. The toolbar data receiving component 308 obtains the toolbar data 304 from a toolbar data source such as, for example, a toolbar data store, a toolbar data server, and/or directly from a toolbar and the like. The resource mining component 310 receives the toolbar data 304 from the toolbar data receiving component 308 and mines the toolbar data 304 for resource information. The resource inspection component 312 receives resources obtained utilizing the resource information from the resource mining component 310. An additional resource extraction component can be employed such as, for example, an optional search engine crawler 314, to obtain the actual resource and/or the resource mining component 310 and/or the resource inspection component 312 can perform this function as well. Filtering of resources can also be performed by these components to remove previously seen resources.

The resource inspection component 312 inspects the resources to determine if any of the resources are unique. Inspection techniques can include, but are not limited to, inspecting images of a video, extracting closed captioned text, employing a speech-to-text detection engine, breaking up video, etc. into stories—e.g., news strings broken up into stories with advertisements removed, extracting points of interest from a video stream, employing image recognition (e.g., recognizing anchor people for news casts), cut detection (e.g., changes from one scene to another), fading-in and fading-out detection, visual artifact detection, compression type detection, image and/or audio detection, and/or frame rate detection and the like. These techniques facilitate the resource inspection component 312 in determining what is and is not a viable/unique resource for the task at hand. The resource inspection component 312 is often referred to as a "cracker" (e.g., for multimedia as a "multimedia cracker" or for text as a "page cracker" or "Web page/html/text parser") because it "cracks open" the resource and inspects it. The resource inspection component 312 then provides the unique resources 306.

Figure 4:
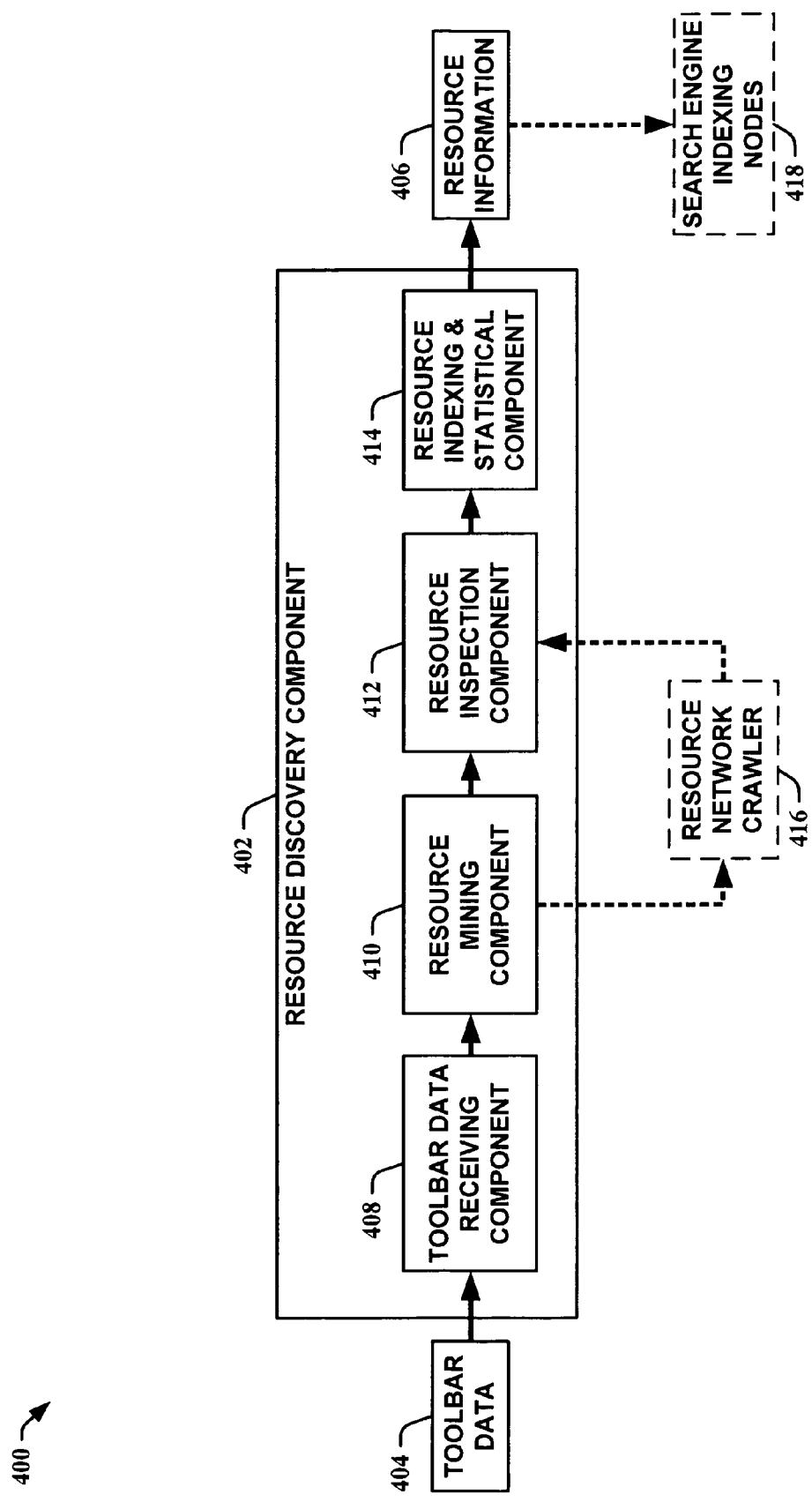
FIG. 4 is still yet another block diagram of a resource discovery system in accordance with an aspect of an embodiment.

Referring to FIG. 4, still yet another block diagram of a resource discovery system 400 in accordance with an aspect of an embodiment is shown. The resource discovery system 400 is comprised of a resource discovery component 402 that receives toolbar data 404 and provides resource information 406. The resource discovery component 402 is comprised of a toolbar data receiving component 408, a resource mining component 410, a resource inspection component 412, and a resource indexing and statistical component 414. The toolbar data receiving component 408 obtains the toolbar data 404 from a toolbar data source such as, for example, a toolbar data store, a toolbar data server, and/or directly from a toolbar and the like. The resource mining component 410 receives the toolbar data 404 from the toolbar data receiving component 408 and mines the toolbar data 404 for resource data. The resource inspection component 412 then receives resources obtained utilizing the resource data from the resource mining component 410.

An additional resource extraction component can be employed such as, for example, an optional resource network crawler 416, to obtain the actual resource and/or the resource mining component 410 and/or the resource inspection component 412 can perform this function as well. Filtering of resources can also be performed by these components to remove previously seen resources. The resource inspection component 412 inspects the resources to determine if any of the resources are unique. The resource inspection component 412 then provides the unique resources to the resource indexing and statistical component 414. The resource indexing and statistical component 414 facilitates in providing resource information 406 by extracting resource metadata, collating access statistics, and/or relaying resource information to search engine indexing nodes 418 for indexing and/or querying.

Figure 5:
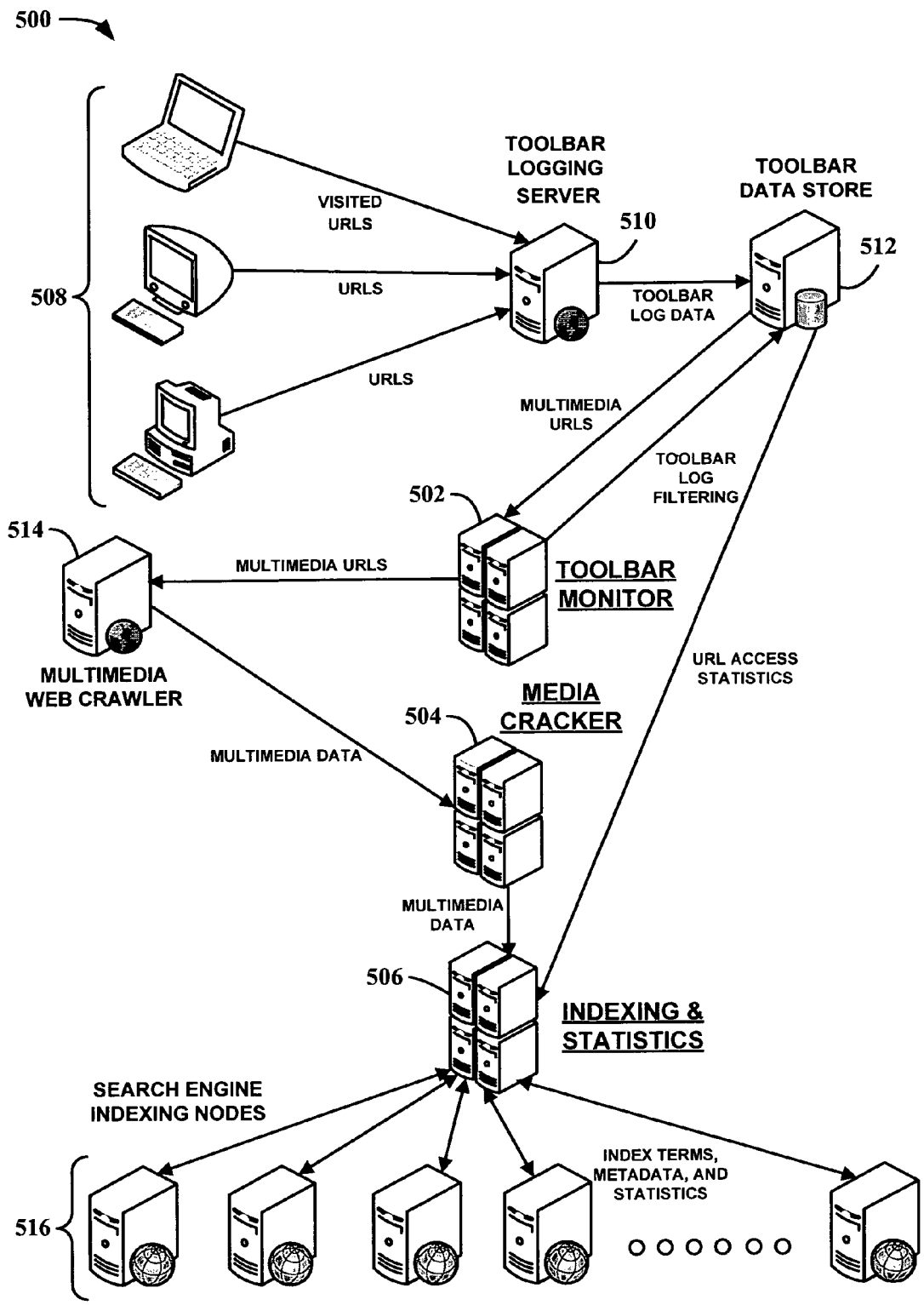
FIG. 5 is an illustration of an example multimedia discovery system in accordance with an aspect of an embodiment.

In FIG. 5, an illustration 500 of an example multimedia discovery system in accordance with an aspect of an embodiment is shown. One instance of the systems and methods herein, for example, can be implemented utilizing three components: a toolbar log monitoring module (referred to as the toolbar monitor) 502, a multimedia cracking module (media cracker) 504, and an indexing and statistics module (indexing and statistics) 506.

Visited URLs are logged, for example, by users' search toolbars on computing devices 508 to a toolbar logging server 510. In turn, the toolbar logging server 510 provides selected data to a toolbar data store 512 which can include a server farm that stores and manages toolbar data for reporting purposes. The toolbar monitor 502 inspects the toolbar data store 512, identifying, for example, multimedia URLs. The identified multimedia URLs are then passed to a multimedia Web crawler 514. The multimedia Web crawler 514 maintains a store of previously visited URLs—if a URL has not been previously visited or requires revisiting, the multimedia Web crawler 514 retrieves the multimedia resource. The media cracker 504 inspects the retrieved multimedia resources and determines if they are indeed unique multimedia resources that can be indexed and searched by a search engine. For resources that can be indexed and searched, the indexing and statistics module 506 extracts metadata, collates access statistics (such as, for example, temporal information and access frequency), and/or passes the information to search engine indexing nodes 516 for indexing and querying.

One instance of multimedia resource discovery is as follows:
1. For each URL stored in the toolbar data store 512:
   a. The toolbar monitor 502 determines if the URL represents a multimedia item. For example, this can be determined by comparing the URL extension to a list of known extensions (including, for example, .mpeg, .mpg, .wmv) and/or identifying keywords in the URL (for example, movie, video, clip):
      i. If the URL does not match, continue from (1).
      ii. If the URL does match, continue with (b) below.
   b. The URL is then passed to the multimedia Web crawler 514 which determines if the URL has been previously seen by, for example, comparing the URL to a list of previously-visited and/or currently indexed URLs maintained by a search engine.
   c. If the URL should not be retrieved, continue from (1) (an exception to this can be when the media needs to be refreshed to ensure that removal and/or modification is detected, etc.). If the URL should be retrieved, continue with (d) below.
   d. The multimedia Web crawler 514 queues the resource for retrieval. The next step (e) proceeds after the resource has been retrieved.
   e. The multimedia and its URL are passed to the media cracker 504. The multimedia cracker 504 inspects the file to determine if it is a desired multimedia item. This, for example, can include examining the preamble of the resource file and comparing to known multimedia preambles (this approach is known to be more reliable than checking MIME types in HTTP headers or relying on file extensions):
      i. If the media is not desired, then continue from (1).
      ii. If the media is desired, then continue with (f) below.
   f. The indexing and statistics module 506 extracts features from the multimedia data, including, for example, file name segments, metadata from within the data stream, and/or statistics about the frequency of access and/or temporal access characteristics of the media.
   g. The URL, index terms, metadata, and/or statistics and the like are then passed to the search engine indexing nodes 516 for indexing. When indexed, the resource is then available to be searched In view of the exemplary systems shown and described above, methodologies that may be implemented in accordance with the embodiments will be better appreciated with reference to the flow charts of FIGS. 6-8. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Figure 6:
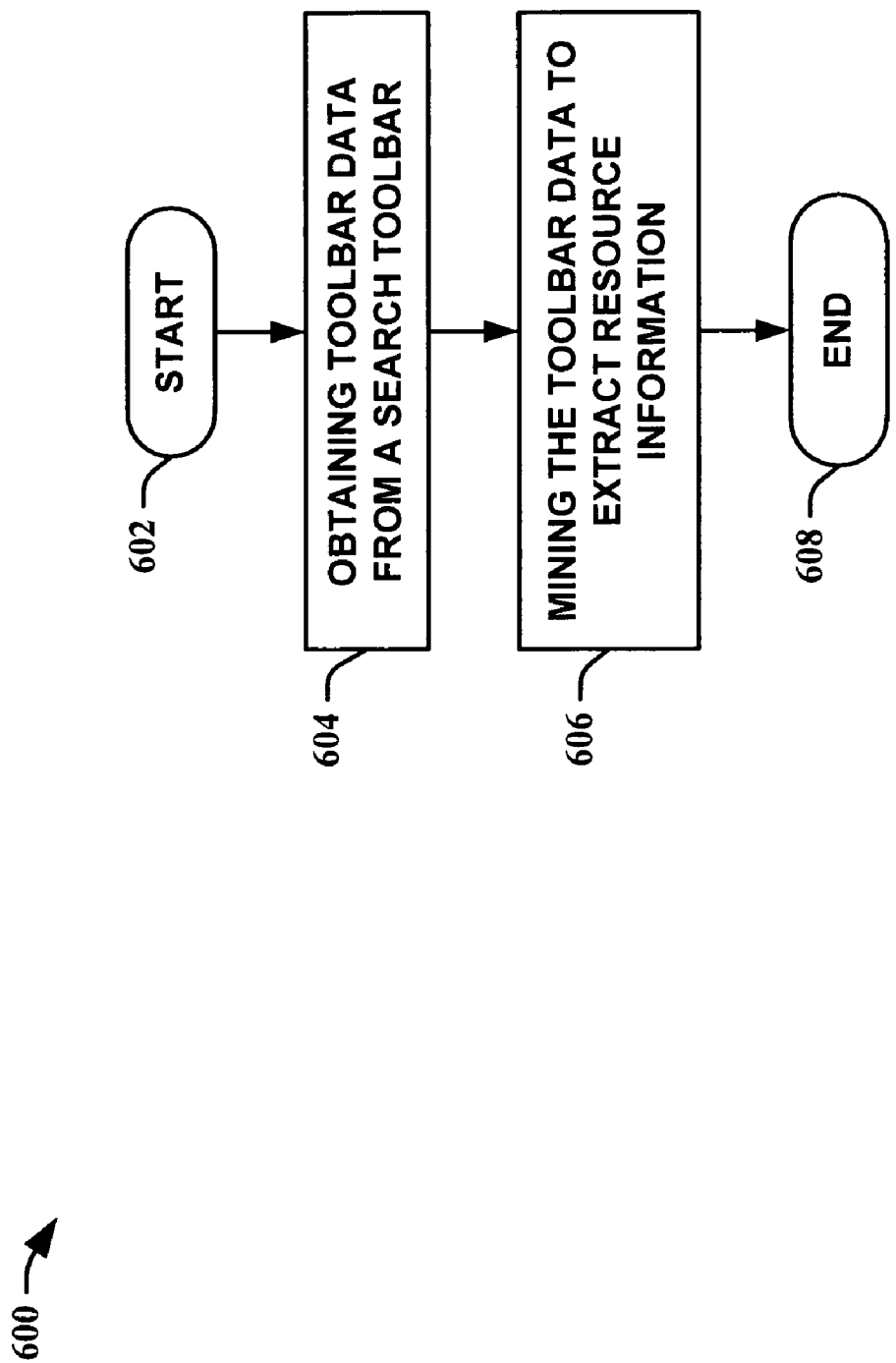
FIG. 6 is a flow diagram of a method of facilitating resource discovery in a network in accordance with an aspect of an embodiment.

In FIG. 6, a flow diagram of a method 600 of facilitating resource discovery in a network in accordance with an aspect of an embodiment is illustrated. The method 600 starts 602 by obtaining toolbar data from a search toolbar 604. Search toolbars are frequently utilized by users to assist browsers in allowing localized and/or non-localized searching from a single application. The toolbar tends to aggregate search data for these reasons and becomes a good source for personalized search data for each user. The toolbar data can be obtained directly from a search toolbar and/or it can also be obtained from a search toolbar data source that can be local and/or remote. A search toolbar data source can include a database with direct access and/or accessible via data servers (e.g., a toolbar data server farm, etc.) and the like. The toolbar data is then mined to extract resource information 606, ending the flow 608. A resource can include, but is not limited to, text, graphics, audio, and/or video resources and the like. A resource generally includes "multimedia" type resources as well as traditional "non-multimedia" resources. Thus, resource information can include, but is not limited to, resources visited by a user, resource locations added to a user's favorites list, resource print events, time spent on a resource, and/or access frequencies for a resource and the like.

Figure 7:
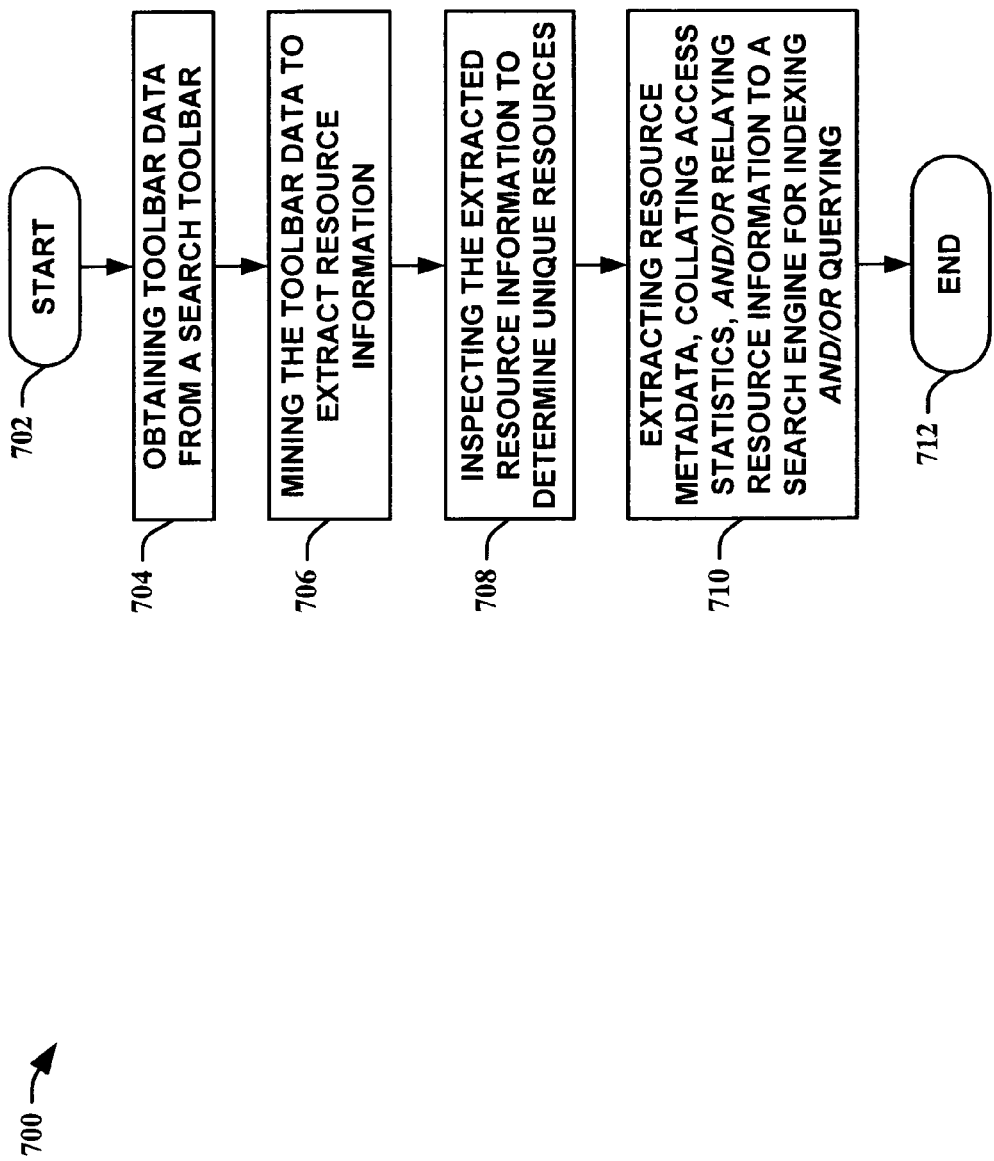
FIG. 7 is another flow diagram of a method of facilitating resource discovery in a network in accordance with an aspect of an embodiment.

Looking at FIG. 7, another flow diagram of a method 700 of facilitating resource discovery in a network in accordance with an aspect of an embodiment is depicted. The method 700 starts 702 by obtaining toolbar data from a search toolbar 704. The toolbar data can be obtained directly from a search toolbar and/or it can also be obtained from a search toolbar data source that can be local and/or remote. A search toolbar data source can include a database with direct access and/or accessible via data servers (e.g., a toolbar data server farm, etc.) and the like. The toolbar data is then mined to extract resource information 706. A resource can include, but is not limited to, text, graphics, audio, and/or video resources and the like as noted supra. A resource generally includes "multimedia" type resources as well as traditional "non-multimedia" resources. The extracted resource information is then inspected to determine unique resources 708. Inspection techniques can include, but are not limited to, inspecting images of a video, extracting closed captioned text, employing a speech-to-text detection engine, breaking up video, etc. into stories—e.g, news strings broken up into stories with advertisements removed, extracting points of interest from a video stream, employing image recognition (e.g., recognizing anchor people for news casts), cut detection (e.g., changes from one scene to another), fading-in and fading-out detection, visual artifact detection, compression type detection, image and/or audio detection, and/or frame rate detection and the like. Uniqueness can be based on, for example, whether a resource has been previously seen, whether a file type (e.g., audio, video, particular format, etc.) of resource is desirable, and/or whether the content is appropriate and the like. Resource metadata is extracted, access statistics are collated, and/or resource information is then relayed to a search engine for indexing and/or querying 710, ending the flow 712. Thus, the resource is processed such that is compatible with search engine indexing and the like to facilitate in making the discovered resource searchable.

Figure 8:
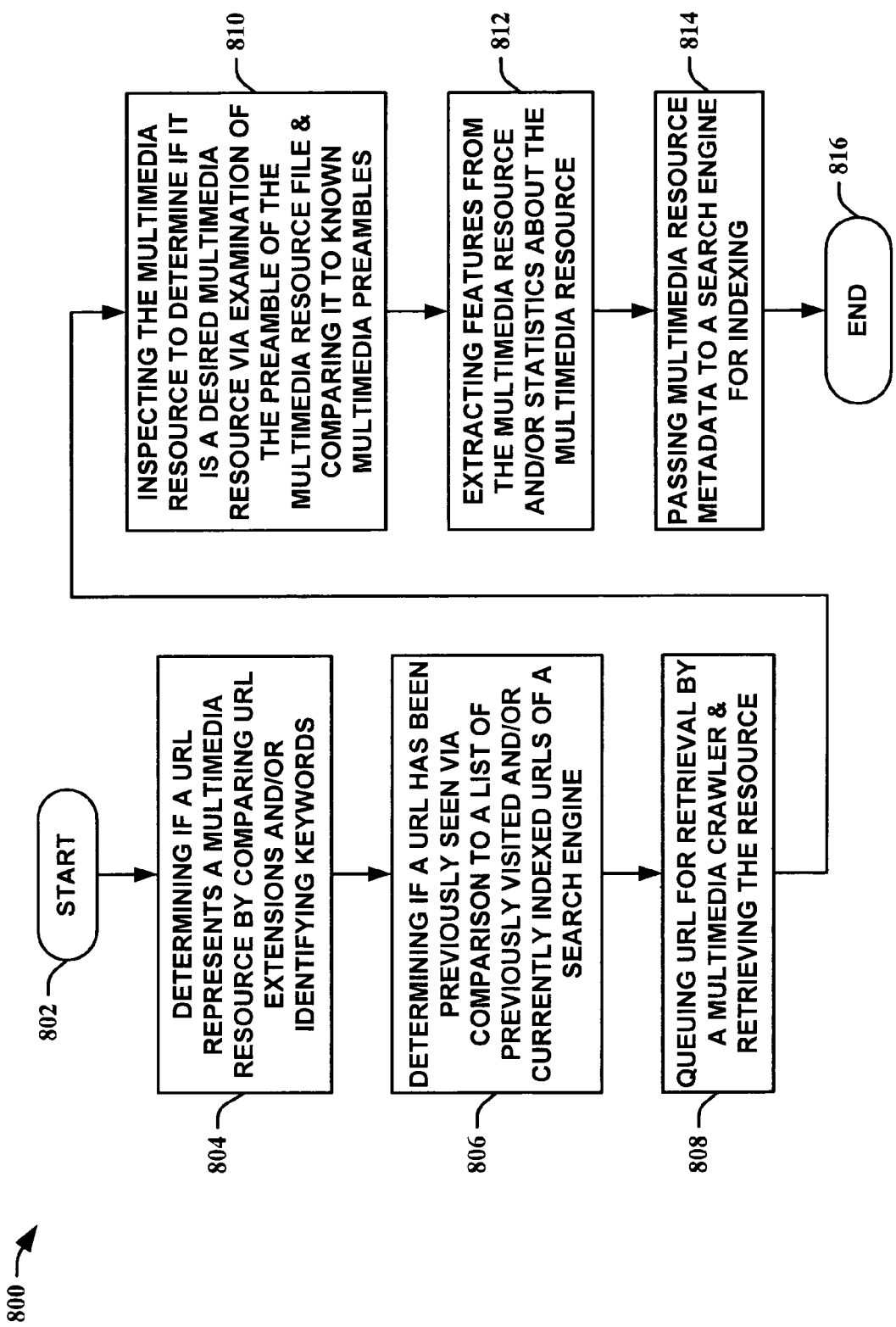
FIG. 8 is a flow diagram of a method of facilitating multimedia discovery in a network in accordance with an aspect of an embodiment.

Turning to FIG. 8, a flow diagram of a method 800 of facilitating multimedia discovery in a network in accordance with an aspect of an embodiment is shown. The method 800 starts 802 by determining if a URL represents a multimedia resource by comparing URL extensions and/or identifying keywords 804. For example, the extensions can include, but are not limited to, .mpeg, .mpg, .wmv, .mov, .avi, etc. It is then determined if a URL has been previously seen via comparison to a list of previously visited and/or currently indexed URLs of a search engine 806. This can be accomplished, for example, by employing a multimedia network crawler that maintains a list of URLs that it has already crawled. A URL is then queued for retrieval by a multimedia crawler and then retrieved at the appropriate time 808. Queuing can be based on resource information mined from the toolbar data. For example, a URL can be moved higher in the queue if the access frequency of the URL is high.

The multimedia resource is then inspected to determine if it is a desired multimedia resource via examination of the preamble of the multimedia resource file and comparing it to known multimedia preambles 810. Utilizing preambles tends to be more reliable than checking MIME types in HTTP headers and/or relying on file extensions. It also helps to circumvent unintentional and/or intentional mislabeling and the like. Features from the multimedia resource and/or statistics about the multimedia resource are then extracted 812. Features can include, for example, file name segments and/or metadata from within a data stream and the like. Statistics can include, for example, frequency of access and/or temporal access characteristics of the multimedia and the like. Multimedia resource metadata is then passed to a search engine for indexing 814, ending the flow 816. The metadata can include, for example, the URL, index terms, other related data, and/or statistics and the like. Once the multimedia resource is indexed, the resource is available to be searched.

Figure 9:
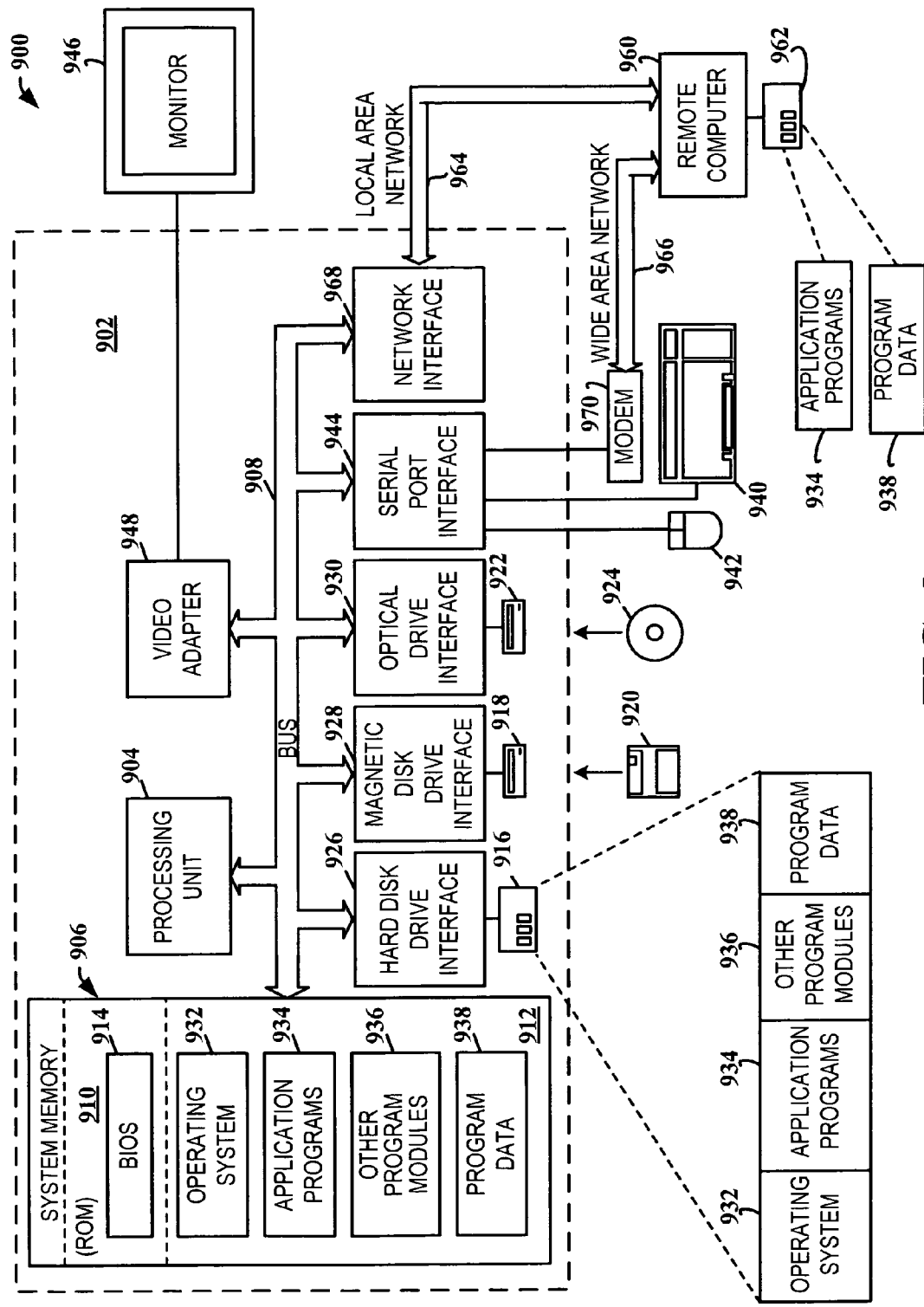
FIG. 9 illustrates an example operating environment in which an embodiment can function.

In order to provide additional context for implementing various aspects of the embodiments, FIG. 9 and the following discussion is intended to provide a brief, general description of a suitable computing environment 900 in which the various aspects of the embodiments can be performed. While the embodiments have been described above in the general context of computer-executable instructions of a computer program that runs on a local computer and/or remote computer, those skilled in the art will recognize that the embodiments can also be performed in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on stand-alone computers. In a distributed computing environment, program modules can be located in local and/or remote memory storage devices.

With reference to FIG. 9, an exemplary system environment 900 for performing the various aspects of the embodiments include a conventional computer 902, including a processing unit 904, a system memory 906, and a system bus 908 that couples various system components, including the system memory, to the processing unit 904. The processing unit 904 can be any commercially available or proprietary processor. In addition, the processing unit can be implemented as multi-processor formed of more than one processor, such as can be connected in parallel.

The system bus 908 can be any of several types of bus structure including a memory bus or memory controller, a peripheral bus, and a local bus using any of a variety of conventional bus architectures such as PCI, VESA, Microchannel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also can include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916-922 and their associated computer-readable media provide nonvolatile storage of data, data structures, computer-executable instructions, etc. for the computer 902. Although the description of computer-readable media above refers to a hard disk, a removable magnetic disk and a CD, it should be appreciated by those skilled in the art that other types of media which are readable by a computer, such as magnetic cassettes, flash memory, digital video disks, Bernoulli cartridges, and the like, can also be used in the exemplary operating environment 900, and further that any such media can contain computer-executable instructions for performing the methods of the embodiments.

A number of program modules can be stored in the drives 916-922 and RAM 912, including an operating system 932, one or more application programs 934, other program modules 936, and program data 938. The operating system 932 can be any suitable operating system or combination of operating systems. By way of example, the application programs 934 and program modules 936 can include a resource discovery scheme for a network in accordance with an aspect of an embodiment.

A user can enter commands and information into the computer 902 through one or more user input devices, such as a keyboard 940 and a pointing device (e.g., a mouse 942). Other input devices (not shown) can include a microphone, a joystick, a game pad, a satellite dish, a wireless remote, a scanner, or the like. These and other input devices are often connected to the processing unit 904 through a serial port interface 944 that is coupled to the system bus 908, but can be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 can include other peripheral output devices (not shown), such as speakers, printers, etc.

It is to be appreciated that the computer 902 can operate in a networked environment using logical connections to one or more remote computers 960. The remote computer 960 can be a workstation, a server computer, a router, a peer device or other common network node, and typically includes many or all of the elements described relative to the computer 902, although for purposes of brevity, only a memory storage device 962 is illustrated in FIG. 9. The logical connections depicted in FIG. 9 can include a local area network (LAN) 964 and a wide area network (WAN) 966. Such networking environments are commonplace in offices, enterprise-wide computer networks, intranets and the Internet.

When used in a LAN networking environment, for example, the computer 902 is connected to the local network 964 through a network interface or adapter 968. When used in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary and other means (e.g., wired or wireless) of establishing a communications link between the computers 902 and 960 can be used when carrying out an aspect of an embodiment.

In accordance with the practices of persons skilled in the art of computer programming, the embodiments have been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
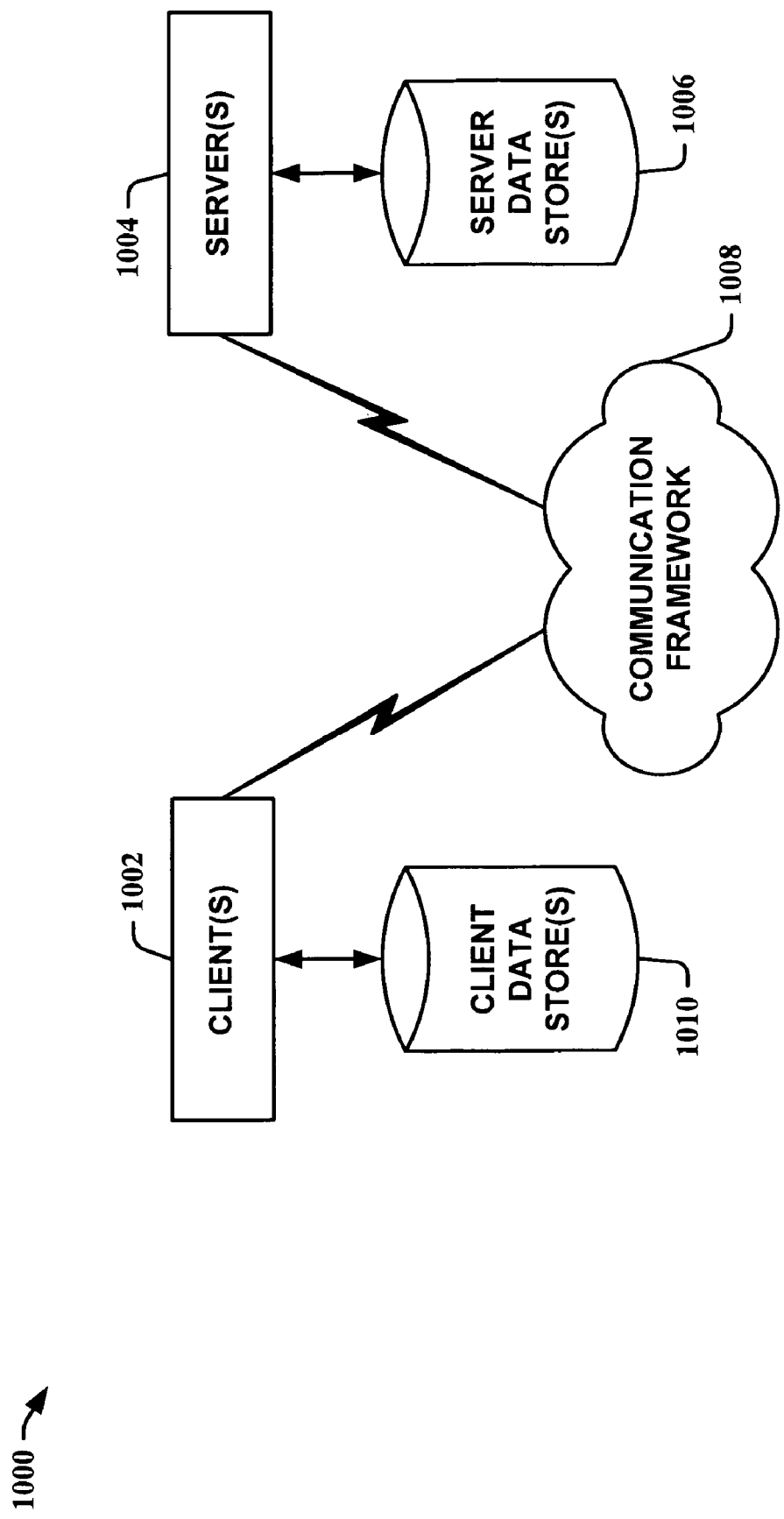
FIG. 10 illustrates another example operating environment in which an embodiment can function.

FIG. 10 is another block diagram of a sample computing environment 1000 with which embodiments can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). One possible communication between a client 1002 and a server 1004 can be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

It is to be appreciated that the systems and/or methods of the embodiments can be utilized in resource discovery facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates discovery of resources on a network, comprising:
 a memory for storing data; and
 a processor coupled to the memory configured to act as:
 a receiving component that receives network search toolbar data from a network search toolbar data source, the network search data comprising identities of respective resources in the network accessed by one or more users;
 a mining component that mines multimedia resource information and determines respective identities of previously undiscovered resources among the resources accessed by the one or more users by obtaining the identities of the respective resources in the network accessed by the one or more users provided in the network search toolbar data and identifying respective resources in the network accessed by the one or more users provided in the network search toolbar data that are not included in a list of currently indexed resources as previously undiscovered resources;
 an inspection component that determines if the previously undiscovered resources comprise unique resources that can be indexed or searched by the search engine; and
 an indexing and statistical component that provides respective previously undiscovered resources identified by the mining component and respective locations of the previously undiscovered resources to a search engine for indexing,
 wherein the mining component identifies the previously undiscovered resources in the network search data prior to forwarding the previously undiscovered resources to the search engine for indexing, and
 wherein the indexing and statistical component performs one or more of extracting resource metadata, collating access statistics, or relaying multimedia resource information to the search engine for indexing or querying.

2. The system of claim 1, the mining component mines the network search toolbar data for information utilized in a search engine crawler or a search engine ranking scheme.

3. A method for facilitating resource discovery from a network, comprising:
 receiving network search toolbar data from a network search toolbar data source, the network search toolbar data comprising locations of respective resources in the network accessed by one or more users;
 employing a computer comprising a processor and a memory to identify resources not previously indexed by a search engine among the resources accessed by the one or more users by analyzing the locations of respective resources accessed by the one or more users provided in the network search toolbar data and comparing the respective resources accessed by the one or more users to a list of resources indexed by the search engine; and providing the identified resources and the respective locations of the identified resources to the search engine for indexing.

4. The method of claim 3 further comprising:

employing the multimedia resource information to facilitate in queuing a search engine crawler based on toolbar metrics.

5. The method of claim 3 further comprising:

utilizing the multimedia resource information to facilitate in ranking search results of the search engine.

6. The method of claim 3 further comprising:

extracting metadata relating to the resources accessed by the one or more users for unique resources;

collating access statistics for the unique resources; and relaying the metadata or collated access statistics to the search engine for at least one of indexing or querying.

7. The method of claim 3 further comprising:

determining if a uniform resource locator (URL) represents a multimedia resource by comparing an extension of the URL to a known list of multimedia URL extensions or identifying one or more keywords associated with the URL.

8. The method of claim 7 further comprising:

determining if the URL has been previously seen via comparison to a list of previously visited or currently indexed URLs of the search engine.

9. The method of claim 8 further comprising:

queuing a URL for a new multimedia resource for retrieval by a multimedia crawler and retrieving it at the appropriate time.

10. The method of claim 9 further comprising:

inspecting the retrieved multimedia resource to determine if it is a desired multimedia resource via examination of its preamble and comparing it to a list of multimedia preambles.

11. The method of claim 10 further comprising:

extracting one or more of features or statistics from a desired multimedia resource.

12. The method of claim 11 further comprising:

relaying multimedia resource metadata to the search engine for indexing or querying.

13. The system of claim 1, wherein the inspection component provides the determined unique resources to the search engine for indexing or searching.

14. The method of claim 3, further comprising:

identifying a series of consecutive events comprising a user access of a resource location in the network and a user access of a multimedia object at the resource location;

determining a relationship between the resource location and the multimedia object; and providing the determined relationship to the search engine to aid in resource indexing.

15. The method of claim 3, further comprising:

identifying a frequency at which a user accesses a resource in the network; and providing the identified frequency to the search engine to aid in ranking search results.

16. A method of discovering multimedia resources on a network from user search data, comprising:

collecting a Uniform Resource Locators (URL) visited by a user from a toolbar data store associated with the user;

identifying a multimedia item associated with the URL;

mining multimedia resource information associated with the URL;

determining whether the URL has been previously processed by comparing the URL to a list of URLs that are currently maintained by a search engine;

forwarding the URL, upon determining that the URL has not been previously processed, to a search engine that includes a search crawler;

retrieving the multimedia item associated with the URL;

examining the multimedia item and its associated URL to determine whether the multimedia item is to be indexed; and extracting one or more features of the multimedia item and indexing the multimedia item using the extracted features wherein examining the multimedia item comprises examining the preamble of the multimedia item and comparing it to a list of multimedia preambles.

* * * * *

UNITED STATES PATENT AND TRADEMARK OFFICE
CERTIFICATE OF CORRECTION

| | | |
|---|---|---|
| PATENT NO. | : 7,827,191 B2 | Page 1 of 1 |
| APPLICATION NO. | : 11/300803 | |
| DATED | : November 2, 2010 | |
| INVENTOR(S) | : Hugh Evan Williams | |

It is certified that error appears in the above-identified patent and that said Letters Patent is hereby corrected as shown below:

In column 14, line 22, in Claim 16, delete "URL" and insert -- URLs --, therefor.

Signed and Sealed this
Eighth Day of February, 2011

David J. Kappos
*Director of the United States Patent and Trademark Office*